United States Patent [19]

Wickström

[11] Patent Number: 5,145,660
[45] Date of Patent: Sep. 8, 1992

[54] PROCEDURE FOR PRODUCTION OF CHLORINE DIOXIDE

[75] Inventor: Peter Wickström, Bromölla, Sweden

[73] Assignee: Eka Nobel AB, Bohus, Sweden

[21] Appl. No.: 689,846

[22] PCT Filed: Nov. 21, 1989

[86] PCT No.: PCT/SE89/00679
§ 371 Date: May 22, 1901
§ 102(e) Date: May 22, 1991

[87] PCT Pub. No.: WO90/05698
PCT Pub. Date: May 31, 1990

[30] Foreign Application Priority Data
Nov. 24, 1988 [SE] Sweden .............................. 8804251

[51] Int. Cl.[5] ............................................. C01B 11/02
[52] U.S. Cl. .................................. 423/480; 423/478; 252/187.21
[58] Field of Search ....................... 423/477, 478, 480

[56] References Cited
U.S. PATENT DOCUMENTS 3,347,628 10/1967 Sepall et al. .................... 423/478
4,081,520 3/1978 Swindells et al. ................. 423/478

Primary Examiner—Gary P. Straub
Assistant Examiner—Valerie Lund
Attorney, Agent, or Firm—Burns, Doane, Swecker & Mathis

[57] ABSTRACT

The invention describes a procedure for production of chlorine dioxide where, in a primary reactor chlorate, sulphuric acid and a reducing agent with optional extra additions of chloride ions are reacted, the resulting gas mixture mainly containing chlorine dioxide and air are forced through a scrubber to an absorption tower for absorption of the product gas. Where the reactor solution is withdrawn from the reactor optionally to a secondary reactor in which reducing agent is also added, the procedure being characterized by that of the primary reactor solution is recirculated optionally via a cooler to the upper part of a scrubber and then returned to the reactor.

15 Claims, 3 Drawing Sheets

PROCEDURE FOR PRODUCTION OF CHLORINE DIOXIDE

BACKGROUND OF THE INVENTION

Chlorine dioxide is presently to a large extent used as a bleaching agent for production of fully bleached chemical pulps. In the 1940s it was discovered that chlorine dioxide had excellent ability to remove lighting from cellulosic fibres without noticeably effecting the cellulosic fibre itself. During this period chlorine and sodium hypochlorite were used as main bleaching and delignification agents. The drawbacks with these chemicals were that during the bleaching and delignification step they also attacked and ruptured the cellulose molecule resulting in a weak fibre and ultimately weak paper products.

A combination of chlorine and chlorine dioxide later turned out to give optimum pulp properties regarding strength, brightness and cleanliness.

Within the bleaching technology the following expressions are used: C=chlorine ($Cl_2$), D=chlorine dioxide ($ClO_2$), E=extraction with sodium hydroxide (NaOH), O=oxygen ($O_2$).

Heretofore, chlorine dioxide was usually used at the end of the bleaching sequence. A typical bleaching sequence would be: C E D E D. During the 1960s and 1970s about 5-15% of the chlorine in the first bleaching stage started to be substituted by chlorine dioxide calculated as available chlorine.

The relationship between chlorine dioxide and chlorine within the bleaching field is expressed as follows: 1 kg of chlorine = 1 kg of available chlorine. 1 kg of chlorine dioxide = 2.63 kg as available chlorine.

The primary reason for adding a small amount of chlorine dioxide in the first bleaching stage was that the fibre strength could be maintained.

During the 1970s, but particularly during the 1980s, the use of chlorinating bleaching agents has more and more been questioned. The primary reason is that when chlorine gas is used as a bleaching agent it produces large amounts of chlorinated organic compounds.

Major experimental work has been done and will continue in order to decrease and perhaps eliminate the use of chlorine gas for bleaching of chemical pulps. Partially for this reason, oxygen delignification has been developed.

Chlorine dioxide also produces chlorinated organic compounds when used as a bleaching agent, but are only a fraction compared to when chlorine gas is used. These compounds are also considered less toxic. For this reason chlorine dioxide is now a candidate for total substitution of chlorine in the first bleaching stage.

As chlorine dioxide is a unique delignification and bleaching agent for chemical pulps with bleaching sequences like O D (E+O) D E D, both chemicals offer maximum utilization with these stages. When going from chlorine to chlorine dioxide bleaching the pulp mill will often have to increase its installed chlorine dioxide capacity substantially. This could lead to a large investment if the old reactor system has to be replaced.

In the beginning chlorine dioxide was produced by reduction of sodium chlorate with sulphur dioxide in sulphuric acid medium according to the so called Holst-procedure. This is a batch process where sodium chlorate solution and sulphuric acid is added to a reactor. A mixture of sulphur dioxide in air was then blown through spargers in the bottom of a reactor. The chlorine dioxide formed was removed from the reaction medium by the sparged air stream and then absorbed in water in a specially designed tower. Later the so called Mathieson Process was developed. Here the reaction components, sodium chlorate, sulphuric acid and sulphur dioxide in air were continuously added to the reactor as shown in FIG. 1. The liquor content from the primary reactor passes through a secondary and sometimes a tertiary reactor where the concentration of sodium chlorate is depleted as much as possible in order to minimize losses. The liquor coming out of the tertiary reactor is called spent acid.

According to other procedures, methanol (the Solvay Process), and chloride (the R-2 Process, R-3 Process, SVP Process, Lurgi Process etc) are being used as reducing agents instead of sulphur dioxide.

When producing chlorine dioxide according to the Mathieson procedure the following reactions are considered to take place

  (1)

  (2)

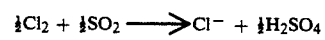  (3)

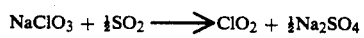  (4)

The above reactions are only used as a tentative description of the process. We do not claim that they are a full description of reality. Particularly reaction 2 can be more complicated than what is described here. This reaction is however anticipated to be the one proceeding with the slowest reaction rate and is therefore the rate limiting one. As can be seen from reaction 2 presence of chloride ions are necessary for chlorine dioxide to be formed. Simultaneously chlorine gas is being produced which according to reaction 3 can react with the reducing agent thereby returning to the chloride state.

The reducing agent for the reaction in the reactor can also be methanol according to the Solvay procedure.

In a Mathieson reactor the yield of chlorine dioxide based on sodium chlorate added often is in the range of 82-88%. The yield loss is primarily depending on that chlorate is reduced to chloride. Thereby the reactor is continuously fed with chloride ions to sustain the chlorine dioxide generation. Some chlorine is however also accompanying chlorine dioxide in the gaseous phase to the absorption tower.

It is known that the yield of chlorine dioxide based on sodium chlorate added can be somewhat increased by extra addition of chloride ions to the reactor.

As earlier mentioned it is often a desire both for quality and environmental reasons that the chlorine dioxide produced is free of chlorine. This can be achieved by extra addition of sulphur dioxide which however automatically leads to a greater yield loss of chlorine dioxide with more expensive production costs as a consequence. In order to improve the yield it is known that a scrubber between the chlorine dioxide generator and the absorption tower can be used as shown in FIG. 2. Thereby the solution of sodium chlorate is added to the upper part of the scrubber. This technique, however, has led to an increased number of so called puffs (low velocity detonations of chlorine dioxide) and what is more serious, fires. Attempt to circumvent these problems with extra additions of water to the scrubber leads to dilution of the reactor solution. This demands added volumes of sulphuric acid which increases production costs.

Below are described two known methods of producing chlorine dioxide gas which will provide a better understanding of the invention later described.

BRIEF DESCRIPTION OF THE DRAWING

Reference is made to attached drawings where.

PROCESS A

Mathieson Process with extra addition of sodium chloride

Figure 1:
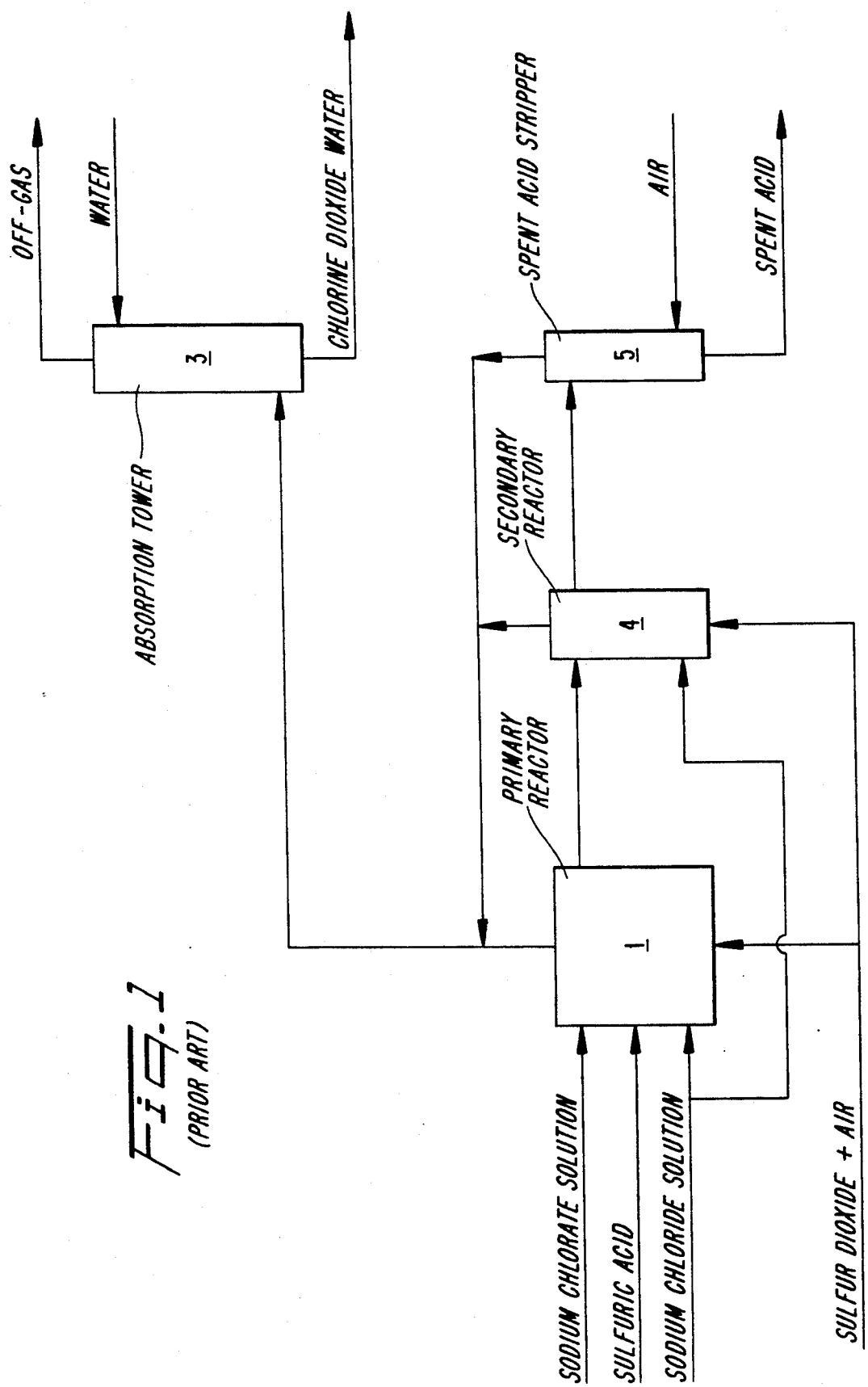
FIG. 1 is a process scheme regarding the normal Mathieson Process with extra addition of sodium chloride.

The principle process scheme is shown in FIG. 1. The chlorine dioxide production is mainly taking place in a primary reactor (1) but partly also in a secondary reactor (4). The chlorate is fed to the reactor as a 46% solution, the sulphuric acid as a 98% solution, the sodium chloride as a 26% solution and the sulphur dioxide as a 5-10% gas mixture in air. The chlorate and sulphuric acid are pumped continuously to the reactor through an adequate feed control system. Filters are used to remove any solid impurities in the solutions. The addition rates are regulated in such a way that the sodium chlorate concentration in the reactor is between 2-35 g/l and the $H_2SO_4$ concentration is between 425-490 g/l.

The sulphur dioxide gas is diluted with air from a compressor to about 5-10% by volume the gas mixture delivering a pressure of about 1 atmosphere is then directed to the bottom of the reactor. Special spargers are here producing small gas bubbles. When the bubbles are rising through the liquor medium of the reactor the $SO_2$ gas is reacting according to equations 3 and 2 above. Whereas the air bubbles are being depleted with sulphur dioxide they are picking up chlorine dioxide gas produced. The gas phase above the liquor medium in the primary reactor is therefore now a mixture of air with chlorine dioxide and small amounts of sulphur dioxide and chlorine. The chlorine dioxide containing air is now piped to an absorption tower (3) where the chlorine dioxide is absorbed in a down stream flow of water. The absorbed chlorine dioxide in water is removed and delivered to a storage tank and the off-gas from the absorption tower fan is either vented to a scrubber or out to atmosphere.

A part of the reaction solution is continuously overflowing from the primary reactor to the secondary reactor where the chlorate concentration is lowered to 2-10 g $NaClO_3$/l. This is effected by passing part of the sulphur dioxide air mixture through a sparger in the bottom of the secondary reactor. In order to achieve this decrease of chlorate concentration approximately 5-15% of the total amount of sulphur dioxide containing air added to the system is used in the secondary reactor. Sodium chloride can also be added to the secondary reactor.

The chlorine dioxide gas formed in the secondary is led into the gas phase of the primary reactor while the liquid phase is overflowing into a stripper (5) where the solution is depleted of chlorine dioxide with an air purge. The purge air containing chlorine dioxide is brought to the primary reactor was phase while the spent acid solution is overflowed from the reaction system. In order to remove the heat generated in the reactors both the primary and the secondary reactors are equipped with cooling devices by which the reaction temperature can be kept between 32°-60° C. When the reactor is not in a production mode the temperature of the liquid reaction medium should not be allowed to decrease below 25° C. At a lower temperature, salt crystallization may occur which can lead to plugging and other production problems.

Chlorine dioxide gas will readily decompose given the right conditions. Decomposition may occur with light, high temperature, high gas concentration or with organic compounds in general. As a result of the decomposition, gaseous chlorine, gaseous oxygen and heat are released. The released heat will increase the temperature in the gas phase of the reactor which accelerates the decomposition rate of the chlorine dioxide gas and may ultimately lead to an explosion. Production equipment is therefore equipped with a safety system which is triggered when the temperature of the gas phase in the reactor has risen beyond a set value.

PROCESS B

Modified Mathieson Process with scrubber between reactor and absorption tower

Figure 2:
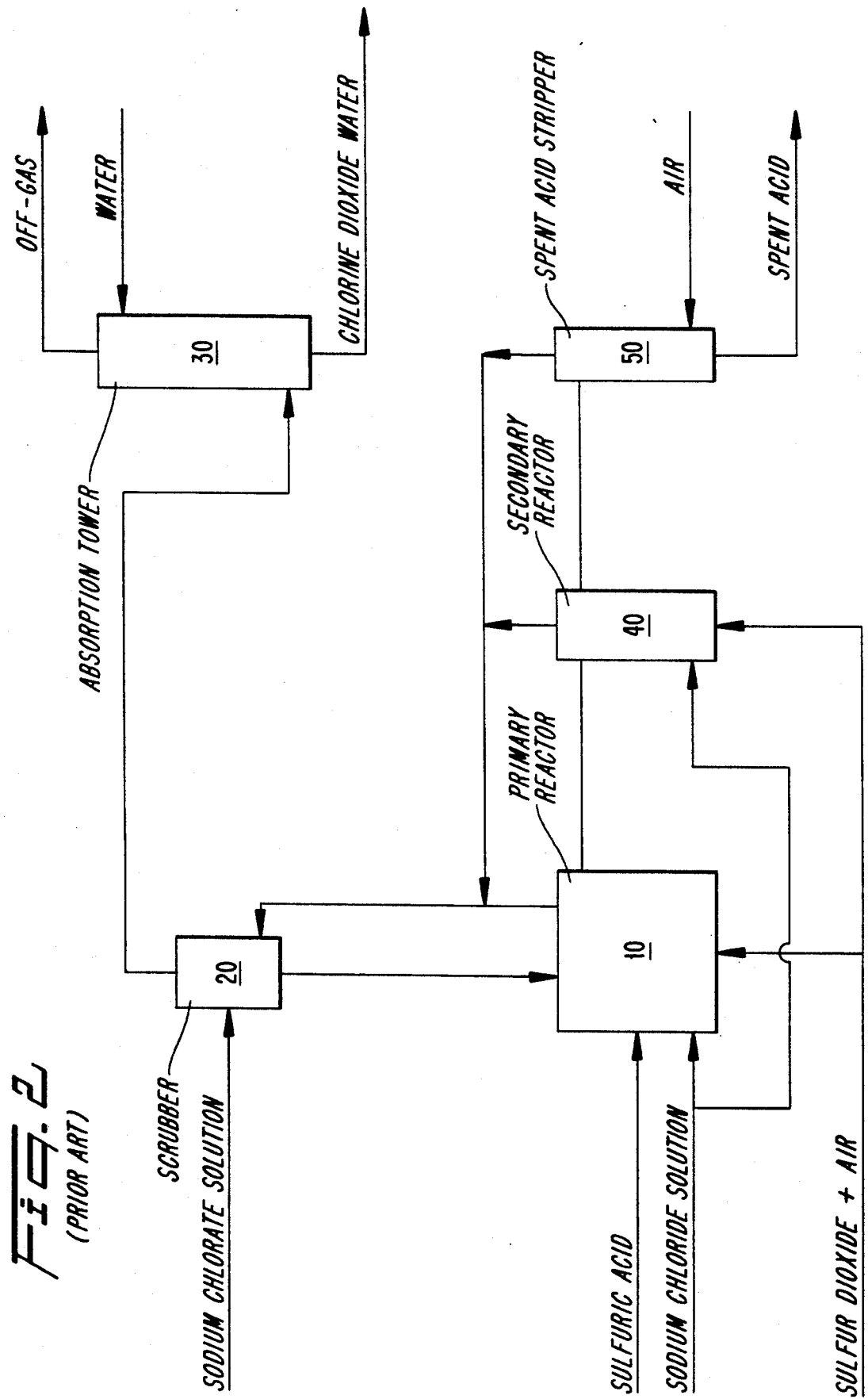
FIG. 2 is a process scheme regarding the modified Mathieson Process with a scrubber between the chlorine dioxide reactor and the absorption tower and FIG. 3 is a process scheme regarding the new method according to the invention to produce chlorine dioxide gas.

Reference is now made to FIG. 2 outlining a modified Mathieson Process which in the main resembles the normal Mathieson Process according to FIG. 1. Reference is therefore made to the description of the normal Mathieson Process under A above.

According to the modified process the chlorate solution is now added to the reactor (1) via a scrubber (2) while the sulphuric acid and the sodium chloride are still fed directly to the primary reactor. Sulphur dioxide gas is also added as per the normal manner.

The gas mixture leaving the primary reactor as previously indicated, contains chlorine dioxide with small amounts of chlorine gas and sulphur dioxide. This air/gas mixture is directed through the scrubber (2) before proceeding to the absorption tower (3). In the scrubber the gas mixture is "washed" with the chlorate solution on its way through the scrubber to the reactor. Chlorine gas and sulphur dioxide considered as impurities are now given another opportunity to react according to equation 3 and returned back to the reactor together with the chlorate. As mentioned previously the yield can be improved by utilizing a scrubber between the chlorine dioxide reactor and the absorption tower. It has been shown, however, that this process at higher production rates than design capacity leads to an increased number of puffs which in certain cases are of higher detonation velocity, and therefore more dangerous.

SUMMARY OF THE INVENTION

Figure 3:
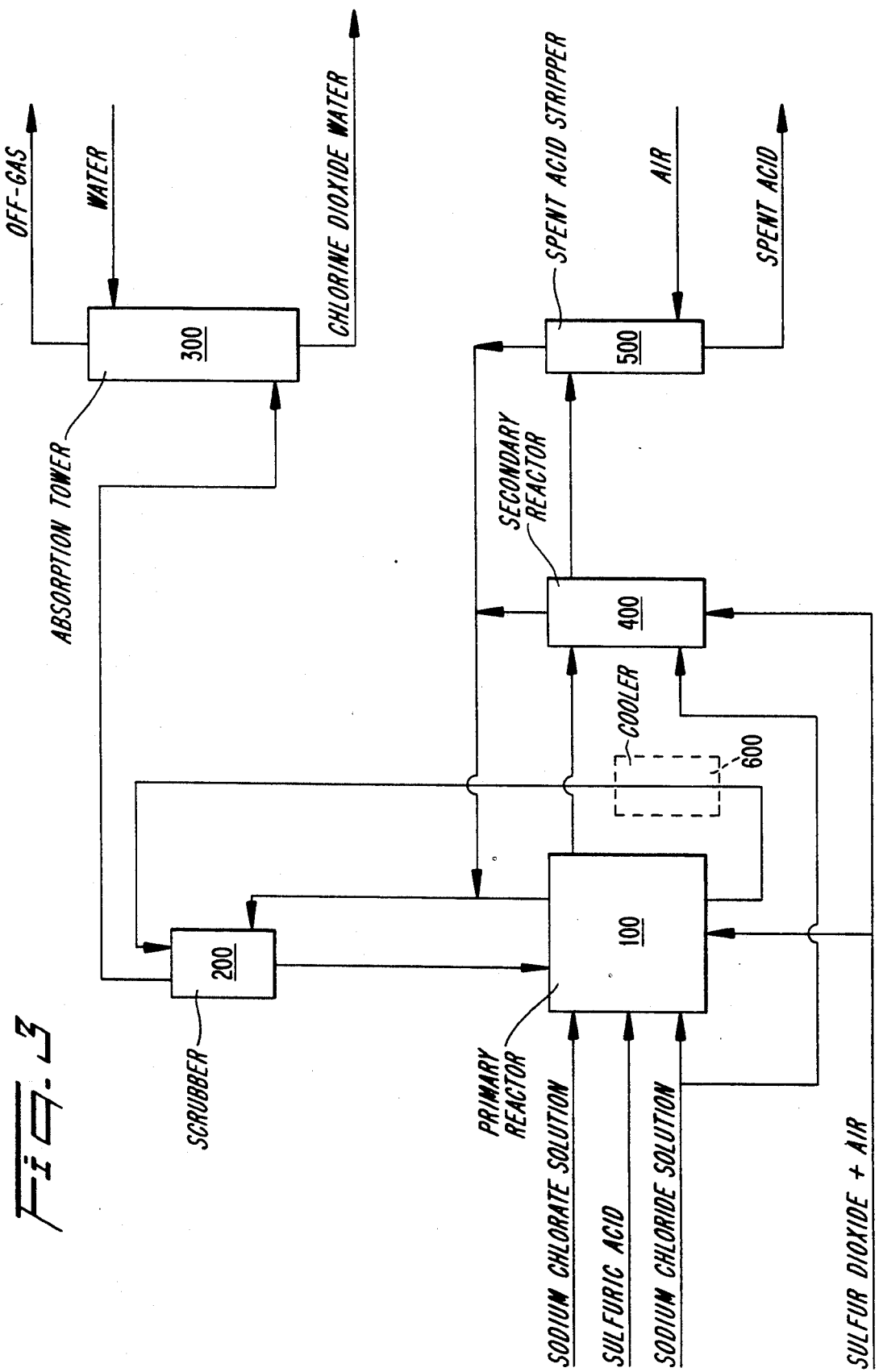

I have now discovered a new way to utilize the gas scrubber principle which enhances hitherto known advantages while at the same time known disadvantages are avoided. This is done by recirculating part of the reactor solution under controlled conditions to the top of a similar scrubber as shown by FIG. 3.

Through my invention
fires can be eliminated
the number of puffs can be reduced to a normal level for a Mathieson Process
no extra addition of water is needed
at the same time
the yield can be substantially increased compared to a normal Mathieson Process
the reactor capacity can be substantially increased
a chlorine gas free chlorine dioxide can be produced.

An important advantage with the invention is, that it is possible with a simple modification to increase the plant output capacity, and at the same time to substantially increase the yield of chlorine dioxide based on sodium chlorate.

The invention consists of a procedure for the production of chlorine dioxide through the reaction in a primary reactor (1) of chlorate, sulphuric acid and a reducing agent optionally with the addition of chloride ions. The gas mixture from the top of the reactor, mainly comprising chlorine dioxide and air is directed via a scrubber (2) to an absorption tower (3) where the chlorine dioxide is absorbed. The spent acid solution from the reactor is fed optionally to a secondary reactor (4) where reducing agent is also added. The invention is characterized by that part of the primary reactor solution (1) is circulated, optionally via a cooler (6), to the upper part of the scrubber (2) and returned to the reactor via the scrubber.

PROCESS C

Modified Mathieson Process according to the invention

The procedure according to the invention is seen from the flow sheet in FIG. 3. The characteristic feature for the invention is that part of the reactor liquid is circulated from the bottom of the chlorine dioxide reactor (1) via a pump and are necessary a cooler.(6) to a scrubber (2) situated above the reactor. This scrubber can for instance be a packed tower, a spray tower, a venturi scrubber etc. The important thing is that the scrubber provides a big area so that unreacted sulphur dioxide can react with chlorine under formation of sulphuric acid and hydrochloric acid which can be returned to the reactor. The chlorine dioxide will after having passed the scrubber be essentially free of chlorine and is fed to the absorption tower (3). The temperature of the recirculating liquid reactor medium to the scrubber is 25°-50° C. and can if necessary be regulated with a cooler (6). The outgoing gas from the scrubber is under the detonation limit for chlorine dioxide that is maximum 70° C., preferably however maximum 60° C. The liquid from the scrubber being returned to the reactor has a temperature which preferably is under the temperature of the primary reactor. The above mentioned temperatures are controlled by the circulating reactor solution. The volume of reactor solution being recirculated can be up to two times the total volume of the liquid phase of the primary reactor per hour.

If methanol is used as a reducing agent in the reactor (1) the right amount of sulphur dioxide will have to be added in the lower part of the scrubber so that reaction 3 as mentioned earlier can take place.

The invention is shown by the following examples.

EXAMPLES 1-3

The tests were made in a Mathieson reactor having a nominal capacity of 7.5 tons of chlorine dioxide/day. In example 1 a normal Mathieson Process as described according to process A above was used. Example 2 describes a procedure according to the process B above (modified Mathieson Process with scrubber between reactor and absorption tower; FIG. 2). Example 3 describes a procedure according to the invention that is process C as described above (FIG. 3).

The following results were obtained as regards to mean production, yield and number of puffs.

| EXAMPLE | 1 | 2 | 3 |
|---|---|---|---|
| PROCESS | A | B | C |
| FIGURE | 1 | 2 | 3 |
| Mean production of chlorine dioxide/ 24 hours | 11 | 11 | 16 |
| Yield calculated on sodium chlorate | 84 | 86 | 92 |
| Number of puffs/month | <0.5 | >5 | <0.5 |

I claim:
1. In a process for producing chlorine dioxide by reacting in a primary reactor a reaction medium comprising sodium chlorate, sulfuric acid and sulfur dioxide as a reducing agent, thereby forming a gaseous mixture containing chlorine dioxide, chlorine byproduct and air, the improvement comprising contacting the gaseous mixture with reaction medium from the primary reactor in a scrubber to thereby remove at least a portion of the chlorine from the gaseous mixture via reaction with the reaction medium in the scrubber, and thereafter recycling the reaction medium from the scrubber to the primary reactor.

2. The process according to claim 1, wherein the reaction medium includes added chloride ions.

3. The process according to claim 1, including the step of cooling the reaction medium from the primary reactor prior to contact with the gaseous mixture in the scrubber.

4. The process according to claim 1, wherein the process further includes reacting the reaction medium in a secondary reactor.

5. The process according to claim 1, wherein said reaction medium from the primary reactor is fed to the upper portion of he scrubber.

6. The process according to claim 1, wherein the reaction medium circulated to the scrubber from the primary reactor is at a temperature of between 25° C. and 50° C.

7. The process according to claim 1, wherein the volume of reaction medium circulated per hour to the scrubber from the primary reactor is up to two times the total volume of the reaction medium.

8. In a process for producing chlorine dioxide by reacting in a primary reactor a reaction medium comprising sodium chlorate, sulfuric acid and methanol as a reducing agent thereby forming a gaseous mixture containing chlorine dioxide and chlorine by product, the improvement comprising contacting the gaseous mixture with sulfur dioxide and reaction medium from the primary reactor in a scrubber, thereby removing at least a portion of the chlorine via reaction with the sulfur dioxide and reaction medium in the scrubber, and thereafter recycling the reaction medium from the scrubber to the primary reactor.

9. The process according to claim 8, wherein the reaction medium includes added chloride ions.

10. The process according to claim 8, including the step of cooling the reaction medium from the primary reactor prior to contact with the gaseous mixture in the scrubber.

11. The process according to claim 8, wherein the process further includes reacting the reaction medium in a secondary reactor.

12. The process according to claim 8, wherein said reaction medium from the primary reactor is fed to the upper portion of the scrubber.

13. The process according to claim 8, wherein at least a portion of the sulfur dioxide fed to the scrubber is absorbed in the reaction medium from the primary reactor.

14. The process according to claim 8, wherein the reaction medium circulated to the scrubber from the primary reactor is at a temperature of between 25° C. and 50° C.

15. The process according to claim 8, wherein the volume of reaction medium circulated per hour to the scrubber from the primary reactor is up to two times the total volume of the reaction medium.

* * * * *